(12) United States Patent
Gim et al.

(10) Patent No.: US 11,922,034 B2
(45) Date of Patent: Mar. 5, 2024

(54) DUAL MODE STORAGE DEVICE

(71) Applicant: Samsung Electronics Co., Ltd., Suwon-si (KR)

(72) Inventors: Jongmin Gim, Milpitas, CA (US); Yang Seok Ki, Palo Alto, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 0 days.

(21) Appl. No.: 17/517,659

(22) Filed: Nov. 2, 2021

(65) Prior Publication Data
US 2023/0062610 A1 Mar. 2, 2023

Related U.S. Application Data

(60) Provisional application No. 63/240,363, filed on Sep. 2, 2021.

(51) Int. Cl.
*G06F 3/06* (2006.01)
*G06F 13/16* (2006.01)

(52) U.S. Cl.
CPC .......... *G06F 3/0634* (2013.01); *G06F 3/0604* (2013.01); *G06F 3/0656* (2013.01);
(Continued)

(58) Field of Classification Search
CPC .... G06F 3/0634; G06F 3/0604; G06F 3/0656; G06F 3/0659; G06F 3/0679; G06F 13/1668; G06F 2212/1016; G06F 3/0664; G06F 2212/7201; G06F 2212/7202; G06F 2212/7208; G06F 3/0607; G06F 3/0635; G06F 3/0661; G06F 12/0238; G06F 3/061
See application file for complete search history.

(56) References Cited

U.S. PATENT DOCUMENTS

| 7,822,884 B2 | 10/2010 | Bruce |
| 8,296,496 B2 | 10/2012 | Mogul et al. |

(Continued)

FOREIGN PATENT DOCUMENTS

| CN | 111143068 A | 5/2020 |
| CN | 112416819 A | 2/2021 |

(Continued)

OTHER PUBLICATIONS

Abulila, Ahmed, et al. "Flatflash: Exploiting the byte-accessibility of ssds within a unified memory-storage hierarchy." Proceedings of the Twenty-Fourth International Conference on Architectural Support for Programming Languages and Operating Systems. 2019. (Year: 2019).*

(Continued)

*Primary Examiner* — Charles Rones
*Assistant Examiner* — Hewy H Li
(74) *Attorney, Agent, or Firm* — Renaissance IP Law Group LLP

(57) ABSTRACT

A system is disclosed. The system may include a processor and a memory coupled to the processor. A storage device may also be coupled to the processor. The storage device may include a first interface and a second interface. The storage device may be configured to extend the memory. A mode switch may select a selected interface of the first interface and the second interface for a command issued by the processor.

22 Claims, 12 Drawing Sheets

(52) U.S. Cl.
CPC .......... *G06F 3/0659* (2013.01); *G06F 3/0679* (2013.01); *G06F 13/1668* (2013.01)

(56) References Cited

U.S. PATENT DOCUMENTS

| | | | |
|---|---|---|---|
| 8,725,927 | B2 | 5/2014 | Manning |
| 9,098,402 | B2 | 8/2015 | Fanning et al. |
| 9,478,274 | B1 | 10/2016 | Michaud et al. |
| 9,734,085 | B2 | 8/2017 | Lu |
| 10,067,684 | B2 | 9/2018 | Xu et al. |
| 10,126,962 | B2 | 11/2018 | Christiansen et al. |
| 10,191,855 | B2 | 1/2019 | Sampathkumar et al. |
| 10,318,185 | B2 | 6/2019 | Hady |
| 10,552,332 | B2 | 2/2020 | Du et al. |
| 10,929,309 | B2 | 2/2021 | Benisty et al. |
| 11,017,126 | B2 | 5/2021 | Marcu et al. |
| 11,074,208 | B1 | 7/2021 | Dastidar et al. |
| 2006/0069820 | A1* | 3/2006 | Lee ................... G06F 13/385 710/36 |
| 2007/0143571 | A1* | 6/2007 | Sinclair ............... G06F 3/0679 711/103 |
| 2009/0089489 | A1 | 4/2009 | Mukaida et al. |
| 2010/0325383 | A1 | 12/2010 | Karamcheti et al. |
| 2011/0252210 | A1 | 10/2011 | Davies |
| 2012/0297117 | A1 | 11/2012 | Jo et al. |
| 2013/0151683 | A1 | 6/2013 | Jain et al. |
| 2014/0181365 | A1* | 6/2014 | Fanning ............... G06F 3/0688 711/103 |
| 2015/0019798 | A1 | 1/2015 | Huang |
| 2016/0026984 | A1 | 1/2016 | Sagano et al. |
| 2016/0162416 | A1 | 6/2016 | Boyd et al. |
| 2017/0220463 | A1* | 8/2017 | Malina ............... G06F 12/0253 |
| 2019/0171387 | A1 | 6/2019 | Willhalm et al. |
| 2019/0391755 | A1 | 12/2019 | Lee et al. |
| 2020/0034067 | A1 | 1/2020 | Yamamoto et al. |
| 2020/0057729 | A1 | 2/2020 | Liu et al. |
| 2020/0097216 | A1 | 3/2020 | Marcu et al. |
| 2020/0097422 | A1 | 3/2020 | Benisty |
| 2020/0401530 | A1* | 12/2020 | Abulila ................. G06F 12/124 |
| 2021/0055990 | A1 | 2/2021 | Iwasaki et al. |
| 2021/0216446 | A1 | 7/2021 | Yang |
| 2022/0171663 | A1 | 6/2022 | Hiregoudar et al. |
| 2022/0244877 | A1 | 8/2022 | Chen et al. |
| 2023/0017824 | A1 | 1/2023 | Park et al. |

FOREIGN PATENT DOCUMENTS

| | | |
|---|---|---|
| CN | 113110799 A | 7/2021 |
| IN | 111427517 A | 7/2020 |

OTHER PUBLICATIONS

Bae, Duck-Ho, et al. "2B-SSD: the case for dual, byte-and block-addressable solid-state drives." 2018 ACM/IEEE 45th Annual International Symposium on Computer Architecture (ISCA). IEEE, 2018. (Year: 2018).*

European Extended Search Report for Application No. 22184665.2, dated Dec. 5, 2022.

Office Action for U.S. Appl. No. 17/511,540, dated Nov. 1, 2022.

1 European Extended Search Report for Application No. 22193409.4, dated Feb. 3, 2023.

Oe, Kazuichi et al., "Non-volatile memory driver for applying automated tiered storage with fast memory and slow flash storage", 2018 Sixth International Symposium on Computing and Networking Workshops (CANDARW), IEEE, 2018, pp. 112-118.

Final Office Action for U.S. Appl. No. 17/511,540, dated Mar. 7, 2023.

Office Action for U.S. Appl. No. 17/511,540, dated Dec. 28, 2023.

* cited by examiner

DUAL MODE STORAGE DEVICE

RELATED APPLICATION DATA

This application claims the benefit of U.S. Provisional Patent Application Ser. No. 63/240,363, filed Sep. 2, 2021, which is incorporated by reference herein for all purposes.

This application is related to U.S. patent application Ser. No. 17/511,540, filed Oct. 26, 2021, which claims the benefit of U.S. Provisional Patent Application Ser. No. 63/222,406, filed Jul. 15, 2021, both of which are incorporated by reference herein for all purposes.

FIELD

The disclosure relates generally to storage devices, and more particularly to a storage device supporting multiple modes for access.

BACKGROUND

Sometimes, a machine may need additional memory for operation. While increasing the normal memory (often Dynamic Random Access Memory (DRAM)) is an option, DRAM may be expensive. Other types of storage may serve to expand memory, exchanging performance for cost. But the technology to access such other types of storage may limit how the storage may be used, reducing its utility.

A need remains to support expanding memory while reducing the performance costs.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
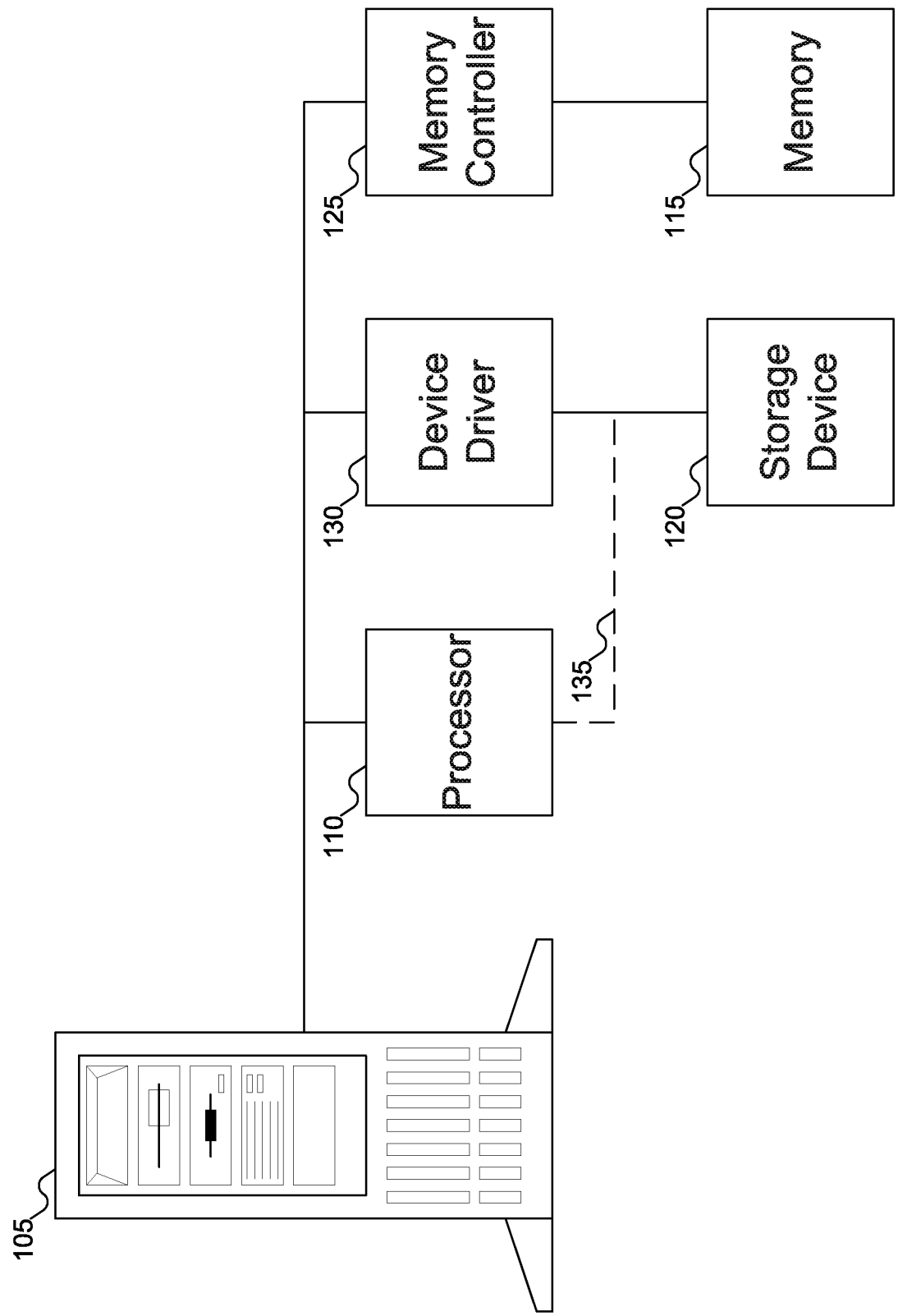
FIG. 1 shows a machine including a storage device that may be used to extend the memory, according to embodiments of the disclosure.

Embodiments of the disclosure include the ability to route commands to a computational storage unit. When a command is received, a command router may determine whether the command is a command to be handled by a storage device or by the computational storage unit. The command may then be directed to either the storage device or the computational storage unit.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Sometimes, a machine may need additional memory for operation. While increasing the memory (often Dynamic Random Access Memory (DRAM)) is an option, DRAM may be expensive. Other types of storage may serve to expand memory, exchanging performance for cost. But the technology to access such other types of storage may limit how the storage may be used, reducing its utility.

Using a storage device, such as a Solid State Drive (SSD), to expand memory in the machine may increase storage by a considerable amount for less than the cost of a comparable amount of memory. For example, the average cost of a 64 gigabyte (GB) DRAM module may be around $350.00, or about $5.47 per GB. On the other hand, a 1 terabyte (TB) SSD may cost around $50.00, or about $0.05 per GB. So, while DRAM may be faster than an SSD, DRAM may cost approximately 100 times as much per GB as an SSD. The cost savings of using an SSD may thus offset the fact that an SSD may be slower to access than DRAM.

But because SSDs may be designed to store large amounts of data, SSDs may also be designed to support reading and writing large amounts of data at a time. For example, while a command to load data from or store data to memory might read or write only, say, 64 bytes per command, an SSD read or write command may process data in chunks of, say, 4 kilobytes (KB). But a host processor may not know that the storage is an SSD, and may attempt to access the storage as though it was memory. Therefore, accessing large amounts of data from the storage in an SSD as though it was memory may take longer than accessing comparable amounts of data from the storage in an SSD when using the SSD as a typical storage device.

Embodiments of the disclosure may overcome these problems by using two interfaces to an SSD being used to extend the memory in the machine. For small amounts of data, conventional load/store commands may be used. But when large amounts of data are to be accessed from storage, and in particular when large amounts of data are to be written to storage, the SSD may be accessed using write commands. Since write commands may support larger amounts of data than store commands, data may be written to storage more efficiently using write commands than using store commands. The operating system may determine which mode to use when storing/writing data to the storage.

FIG. 1 shows a machine including a storage device that may be used to extend the memory, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. But when storage device 120 is used to extend memory 115, processor 110 may issue commands to load and/or store data as though storage device 120 were additional memory 115. In such embodiments of the disclosure, the storage offered by storage device 120 may be used by processor 110 as though storage device 120 were itself memory 115, even though storage device 120 may use a different physical structure and different access mechanism than memory 115. In the remainder of this document, unless context implies otherwise, it should be understood that storage device 120 is being used to extend memory 115, and may not be used by an application to store and retrieve data (files, objects, or other data types) as a storage device used for more traditional purposes.

In embodiments of the disclosure where storage device 120 is used to extend memory 115, a cache-coherent interconnect protocol, such as the Compute Express Link® (CXL) protocol, or Peripheral Component Interconnect Express (PCIe) protocol, may be used to extend memory 115 using storage device 120. (Compute Express Link is a registered trademark of the Compute Express Link Consortium, Inc.) In embodiments of the disclosure, connection 135 may be used to enable processor 110 to communicate with storage device 120. But embodiments of the disclosure may also enable access to storage device 120 via other mechanisms, such as device driver 130 via an interface such as the PCIe interface.

While FIG. 1 shows one storage device 120, there may be any number (one or more) of storage devices in machine 105.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. In addition, while the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

Figure 2:
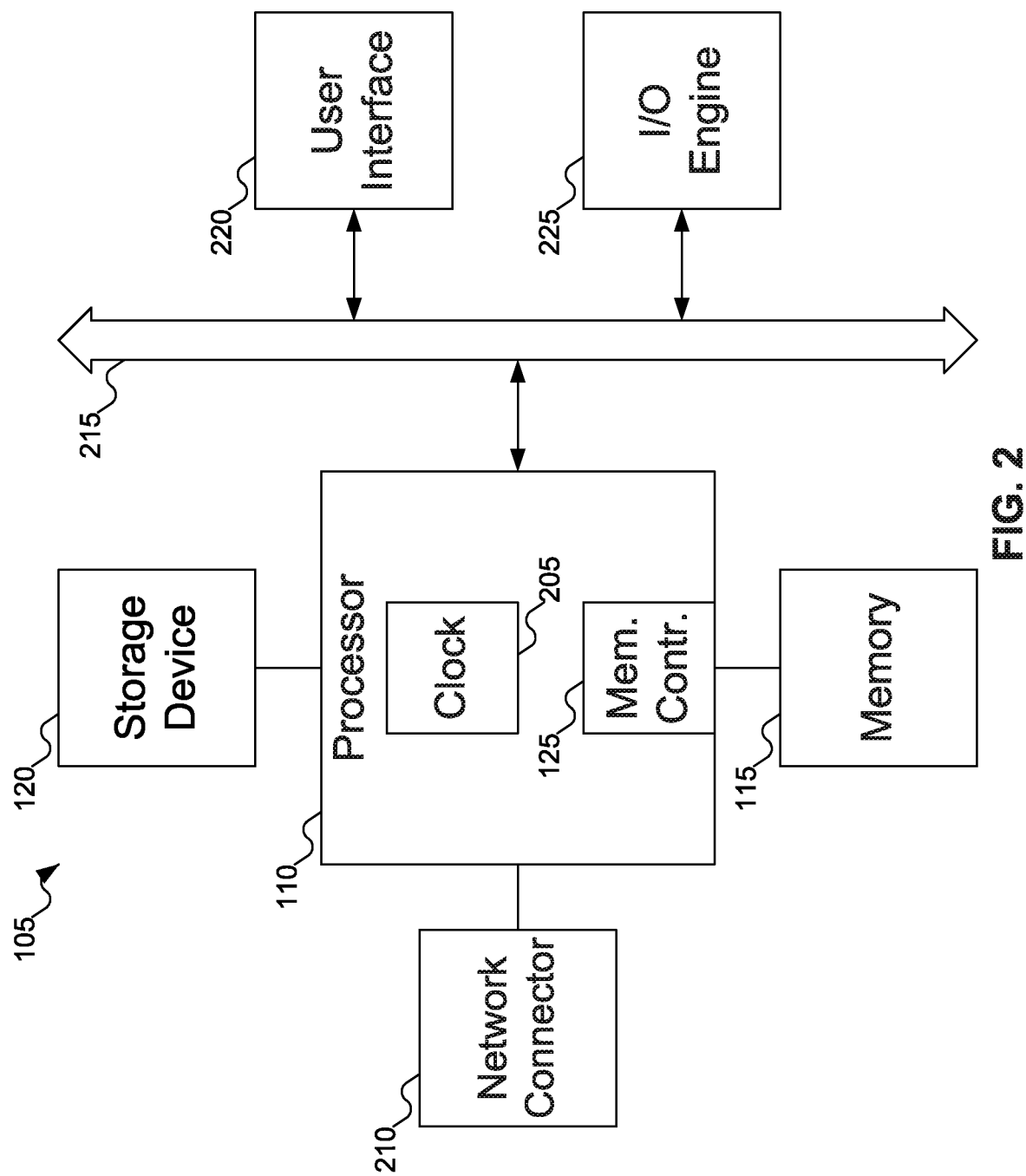
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
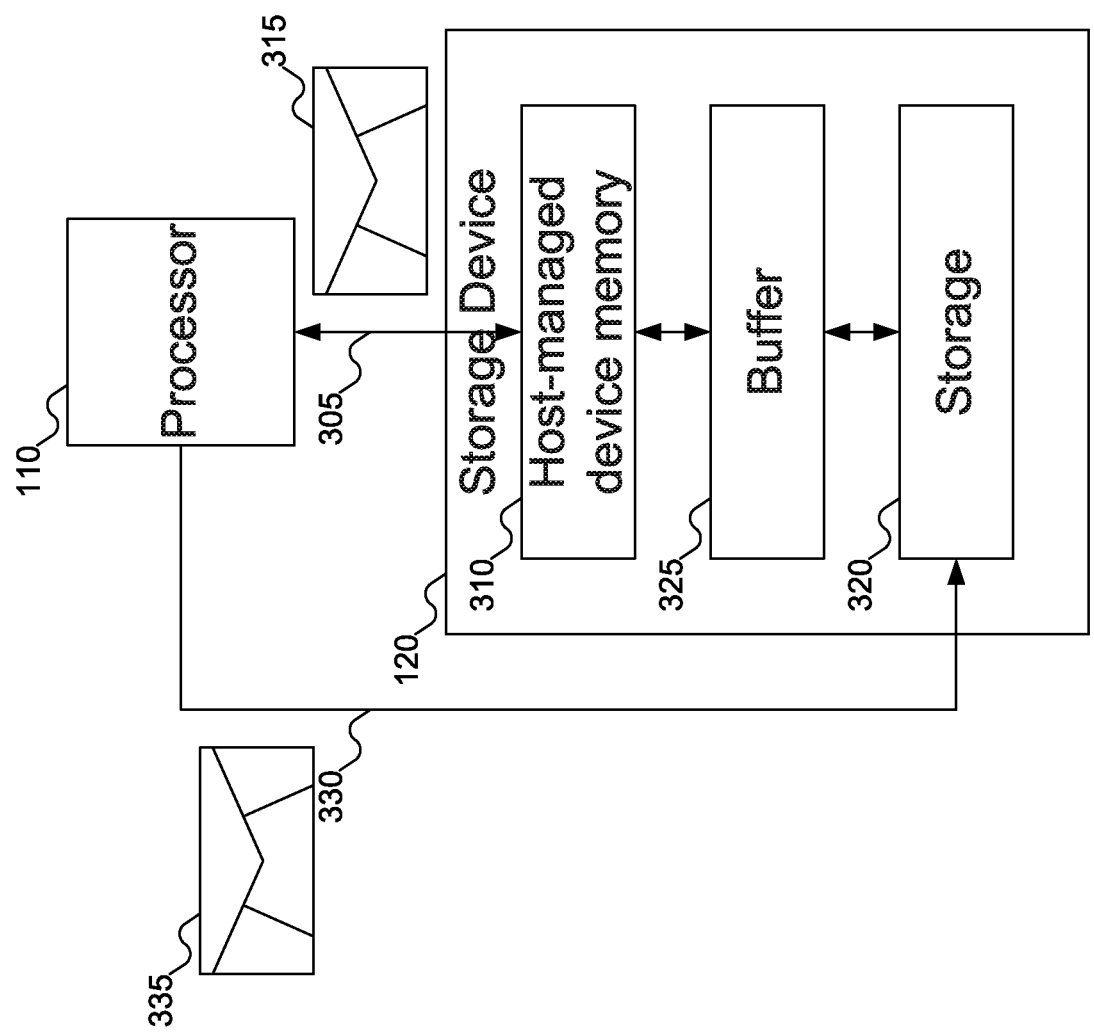
FIG. 3 shows the processor of FIG. 1 communicating with the storage device of FIG. 1 using two modes, according to embodiments of the disclosure.

FIG. 3 shows processor 110 of FIG. 1 communicating with storage device 120 of FIG. 1 using two modes, according to embodiments of the disclosure. In FIG. 3, in one mode processor 110 may communicate with storage device 120 using mode 305. In mode 305, storage device 120 may include host-managed device memory (HDM) 310. Processor 110 may access HDM 310 in the same manner as memory 115 of FIG. 1: processor 110 may issue load and store commands (represented as command 315) to read data from and write data to HDM 310. HDM 310, from the perspective of processor 110, may be thought of as another memory module just like memory 115. The underlying data may actually be stored in storage 320, with HDM 310 acting as a "front end" for processor 110 to access the data.

In an extended memory system, processor 110 may use a range of addresses, some of which may be in memory 115 of FIG. 1 and some of which may be in storage device 120. For example, consider a situation where memory 115 of FIG. 1 includes eight gigabytes (GB) of memory, and storage device 120 includes eight GB of storage. Processor 110 may use addresses 0x0 0000 0000 through 0x1 FFFF FFFF to access data in memory 115 of FIG. 1, and addresses 0x2 0000 0000 through 0x3 FFFF FFFF to access data in storage device 120. As far as processor 110 is concerned, machine 105 of FIG. 1 offers 16 GB of memory, accessible through addresses 0x 0000 0000 through 0x3 FFFF FFFF: processor 110 may not be concerned with what forms of storage are used to provide this 16 GB of memory. But given a particular address, a virtual memory management may know where the requested data actually resides.

When processor 110 issues a request to access a particular address, this address is termed a "physical address". For data stored in memory 115 of FIG. 1, this term is reasonable: data at address, say, 0x0 0000 1000 may be located at that actual address in memory 115 of FIG. 1. But for data stored on storage device 120, this term "physical address" might not be descriptive. For example, some storage devices, such as Solid State Drives (SSDs), may use translation layers to map a particular address as used by processor 110 to the address where the data is actually stored. In this manner, as discussed further with reference to FIG. 5 below, such storage devices may relocate data as needed without having to inform processor 110 of the new address where the data is stored. Thus, context may matter in understanding whether the term "physical address" refers to the actual physical location on storage device 120 where the data is stored or merely some other logical identifier for where the data is stored on storage device 120 (with storage device 120 handling a mapping from the "physical address" used by processor 110 to the actual storage location of the data on storage device 120).

In addition to these operations, the virtual memory management may also manage a page table. A page table permits an application to use virtual addresses, which may be mapped to physical addresses. For every data used by an application, there may be an entry in the page table that associates the virtual address used by the application and the physical address (at least, from the perspective of processor 110) in the extended memory system where the data is stored. In this manner, two or more applications may use the same virtual address, which may be mapped to different physical addresses, which may prevent the two applications from accessing the same data. (Of course, if the applications want to share data, then their respective page tables may map virtual addresses to the same physical address.)

But there may be some complications in using storage device 120 to extend memory 115 of FIG. 1. One complication may be the size of storage device 120 itself, and whether the entire storage device 120 is exposed to processor 110. In some embodiments of the disclosure, HDM 310 may be equal in size to storage 320 offered by storage device 120. In other embodiments of the disclosure, storage 320 may be larger than HDM 310. For example, storage 320 might be approximately 10 times as large as HDM 310.

In some embodiments of the disclosure where storage 320 is larger than HDM 310, HDM 310 may be mapped to a particular set of addresses in storage 320. Processor 110 may be unable to access data in addresses that do not map to addresses in HDM 310. In such embodiments of the disclosure, the larger space in storage 320 may be lost, and storage device 120 may appear to only offer as much storage as HDM 310 offers.

In other embodiments of the disclosure where storage 320 is larger than HDM 310, processor 110 may still be able to access any data from storage 320. For example, consider the situation where HDM 310 includes 10 GB, and storage 320 includes 20 GB. If processor 110 attempts to access an address that is outside the address set currently supported by HDM 310, storage device 120 may flush (i.e., write) any data from HDM 310 to storage 320, then load another 10 GB of data from storage 320 into HDM 310.

Another complication may be the unit of access for data on storage device 120. For example, memory 115 of FIG. 1 is typically byte-addressable: processor 110 may attempt to read or write an individual byte within memory 115 of FIG. 1. But storage device 120 might not be byte-addressable. For example, SSDs are typically written or read in units of a page or a block. A page may be, for example, approximately 4 KB or 8 KB in size (although other page sizes may also be used). A block may contain, for example, 128 pages or 256 pages (although blocks may include other numbers of pages). Therefore, a block may be many KB or MB in size: for example, a block that includes 256 pages of 4 KB each may include 1 MB of storage. Reading or writing 1 MB of data just to access a single byte may be inefficient.

To address this problem, storage device 120 may include buffer 325. Buffer 325 may be a module such as a DRAM module (similar to the modules that may make up memory 115 of FIG. 1). HDM 310 may support byte-addressable access to buffer 325. Storage device 120 may then load and flush data between storage 320 and buffer 325 as needed. Thus, when processor 110 attempts to access an address from HDM that maps to an address in storage 320 not currently loaded in buffer 325, storage device 120 may write any changed data in buffer 325 to storage 320, then load a new portion of storage 320 into buffer 325 to enable processor 110 to access the data via HDM 310.

A third complication in using storage device 120 to extend memory 115 of FIG. 1 may be the basic unit of access. For example, when processor 110 accesses memory 115 of FIG. 1, processor 110 may load and store data in units of, say, 64 bytes (which may be the size of a cache line). But as discussed above, storage device 120 may use the page or the block as the basic unit of access, which may be larger (potentially orders of magnitude larger) than the size of the basic unit of access to memory 115 of FIG. 1.

While using a smaller unit of access to access storage device 120 might not be detrimental (storage device 120, via HDM 310 and buffer 325, may manage accessing data using the smaller sized unit of access), using a smaller unit of access may be inefficient, particularly where large amounts of data are being transferred. For example, to send 4 KB (which may be the size of a page) worth of data using 64 bytes (the basic unit of access for memory 115) at a time may involve 64 load or store commands, whereas a single native command for storage device 120 may enable transferring that amount of data.

To address this complication, processor 110 may also communicate with storage device 120 using mode 330. In mode 330, storage device 120 may issue direct memory access (DMA) commands, such as command 335, to storage device 120. These commands may use the native command set supported by storage device 120 to access data, such as an application attempting to access a file via a file system might use. For transferring larger amounts of data between processor 110 and storage 320, using native commands may be more efficient, and might lead to a 30% improvement (at least for bulk data access) in access to storage device 120.

In some embodiments of the disclosure, command 335 may include any native command supported by storage device 120. In other embodiments of the disclosure, command 335 may be limited to write commands. In such embodiments of the disclosure, requests to access data from storage 320 may be handled via command 315 in mode 305. The reason mode 330 might not be used to handle data read operations may be to ensure data consistency: if data is read via mode 330, information about what data might need to be written back to storage 320 (for example, from a write-back cache in processor 110) may be lost, which might ultimately lead to data loss. In the remainder of this document, commands 335 issued via mode 330 may be limited to commands to write data to storage 320 (not to read data from storage 320). But embodiments of the disclosure may include commands 335 as including commands to read data from storage 320, provided that consistency and synchronization issues may be otherwise resolved.

Figure 4:
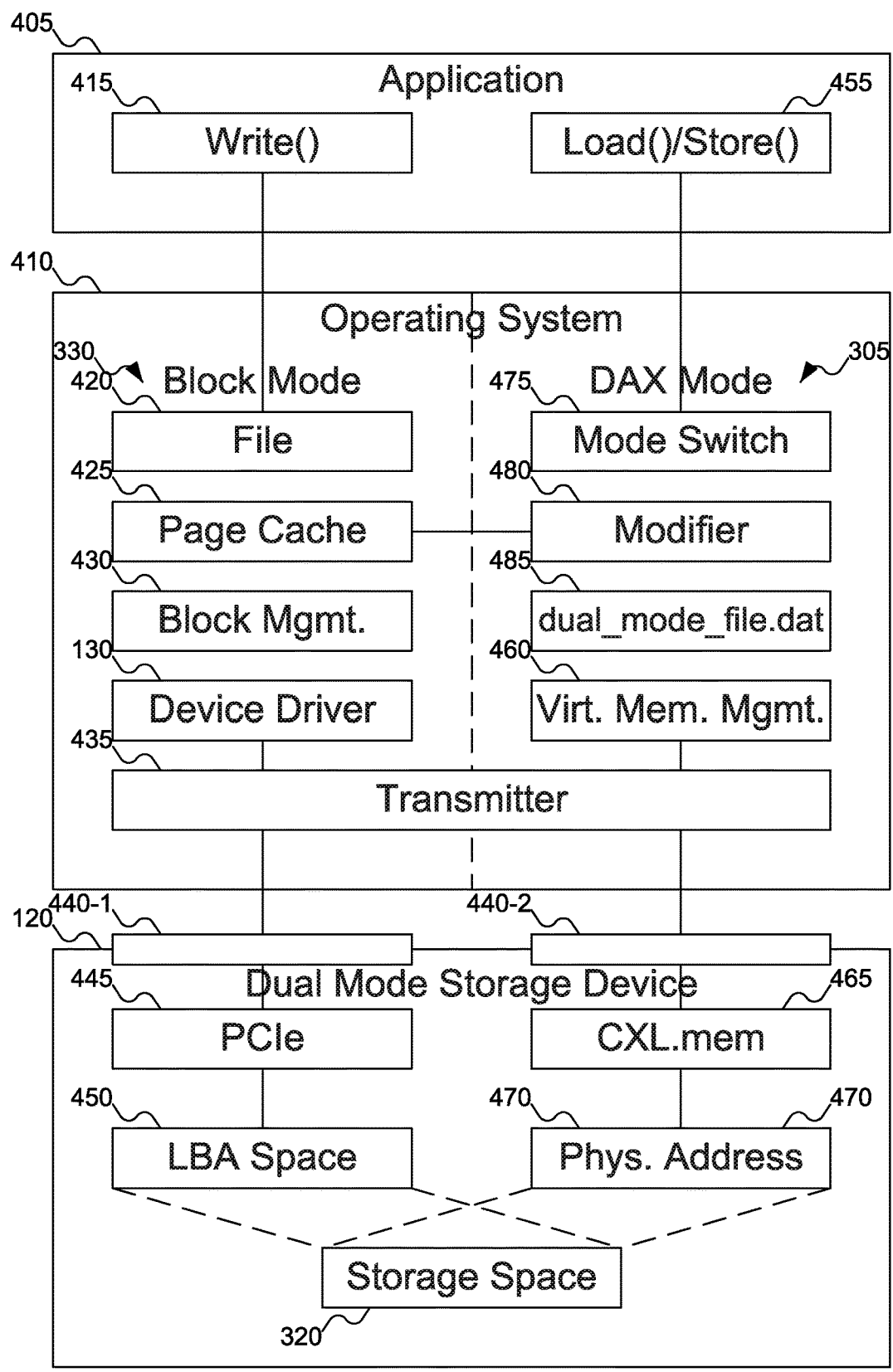
FIG. 4 shows an operating system in the machine of FIG. 1 communicating with the storage device of FIG. 1 using two modes, according to embodiments of the disclosure.

FIG. 4 shows an operating system in machine 105 of FIG. 1 communicating with storage device 120 of FIG. 1 using two modes, according to embodiments of the disclosure. In FIG. 4, application 405 may communicate with operating system 410, which in turn may communicate with storage device 120.

Application 405 may issue commands, such as commands 315 and 335 of FIG. 3, to access data from storage device 120. Application 405 may issue write command 415 to write data to storage device 120. Note that in this situation, application 405 may be aware that storage device 120 is acting to extend memory 115 of FIG. 1 but may issue the appropriate commands to perform a page- (or block-) sized write command on storage device 120. Write command 415 may be delivered to operating system 410, which may offer block mode 330. In block mode 330, access to data on storage device 120 may be provided as with any storage device offering block access. Operating system may enable access to a file such as file 420, store data from file 420 in page cache 425, manage the blocks of data in file 420 (which may be identified using logical block addresses (LBAs) or other logical identifiers) using block management 430, and use device driver 130 to access storage device 120, sending write command 415 to storage device 120 via transmitter 435.

Storage device 120 may include interface 440-1. Interface 440-1 may enable using the block mode to access storage device 120: for example, commands received over interface 440-1 may be expected to use the PCIe protocol, and may be interpreted using PCIe module 445.

As discussed further with reference to FIG. 5, below, in identifying a particular data being requested from storage device 120, application 405 may use a logical identifier, such as an LBA. This LBA may be an identifier within LBA space 450. Storage device may map this LBA to a physical address, such as a physical block address (PBA) on storage device 120 where the data is actually stored in storage space 320. This mapping may be performed using, for example, a flash translation layer. In this manner, application 405 may refer to the data without having to know exactly where the data is stored on storage device 120, and without having to update the identifier if the data is relocated within storage device 120.

On the other hand, application may issue load/store command 455 to read/write data from memory 115 of FIG. 1, which may be extended by storage device 120. Load/store command 455 may be delivered to operating system 410, which may also offer direct access for files (DAX) mode 305. Application 405 may use mmap( ) to perform memory mapping, which may enable byte-addressable access to the data in the extended memory system. When operating system 410 receives load/store command 455, operating system 410 may use mode 305 of FIG. 3 to process load/store command 455. In mode 305 of FIG. 3, operating system 410 may provide the command to virtual memory management 460, which may then deliver the command to storage device 120. Virtual memory management 460 may examine the virtual address used in load/store command 455 and map that virtual address to a physical address. From this physical address, virtual memory management 460 may identify where the data is actually stored: on storage device 120 or memory 115 of FIG. 1, for example. Once virtual memory management 460 has determined that load/store command 455 should be directed to storage device 120, operating system 410 may then send load/store command 455 to storage device 120 via transmitter 435. (If virtual memory management 460 determines that load/store command 455 should be directed to memory 115, load/store command 455 may travel a different path than if load/store command 455 is sent to storage device 120: the latter may travel across a bus such as a PCIe bus, whereas the former may travel across a memory bus, which may involve a different transmitter than transmitter 435.)

Storage device 120 may include interface 440-2. Interface 440-2 may enable using the DAX mode to access storage device 120: for example, commands received over interface 440-2 may be expected to use the CXL.mem protocol, and may be interpreted using CXL.mem module 465. As discussed above with reference to FIG. 3, while the load/store command received at interface 440-2 may use a physical address which may be within physical addresses 470, this physical address may actually be another logical identifier for the data. Storage device 120 may then map physical addresses 470 to storage space 320 (which may or may not use a flash translation layer, depending on whether the physical addresses may be directly mapped). Note that storage space 320 is mapped to by both physical addresses 470 and LBA space 450.

Not shown in FIG. 4 are HDM 310 and buffer 325 of FIG. 3. HDM 310 and buffer 325 of FIG. 3 may be included to support the use of CXL.mem module 465 and the mapping of physical addresses 470 to storage space 320.

Operating system may also determine that load/store command 455 (particularly when the command is store command 455) may be better handled using block mode access. In such embodiments of the disclosure, operating system 410 may use mode 330 of FIG. 3 to process load/store command 455. In mode 330 of FIG. 3, mode switch 475 may direct command 455 to be handled using block mode 330, even though the command was issued using DAX mode 305. Once operating system 410 has directed command 455 to be handled using block mode 330, the command may be processed similarly as though application 405 had issued write command 415.

Note that using mode switch 475 may result in load/store command 455 being processed as though it was write command 415. Because the format of the commands may differ, before processing command 455 using block mode 330, operating system 410 may use modifier 480 to modify load/store command 455 into a format similar to write command 415 before processing the command using block mode 330. In this manner, storage device 120 may recognize and process the modified command. But despite mode switch 475 processing load/store command 455 as though it was write command 415, as far as application 405 is concerned, application 405 is still accessing data in an extended memory system. Application 405 may not be aware that the data is stored in storage 320 or that operating system 410 may ultimately process load/store command 455 using write commands.

There are a number of ways in which operating system 410 may make the decision to handle store command 455 using block mode 330. One way operating system 410 may make the determination to use block mode 330 to handle store command 455 may be based on a parameter of operating system 410. For example, in some embodiments of the disclosure, operating system 410 may have a system-wide parameter (at least for use within the user space including application 405) that may indicate whether store command 455 should be handled using block mode 330. If this parameter is set, then store command 455 may be handled using block mode 330; if this parameter is not set, then store command 455 may be handled using DAX mode 305. Application 405 may then alter this parameter as appropriate to specify whether store command 455 should be handled using block mode 330 or DAX mode 305.

In some embodiments of the disclosure, a file in operating system 410, such as file 485, may include a value and/or an attribute (such as a property associated with the file handled as metadata by operating system 410) that specifies whether store command 455 should be handled using block mode 330 or DAX mode 305: application 405 may change this value and/or attribute in file 485 as appropriate to specify whether store command 455 should be handled using block mode 330 or DAX mode 305. Operating system 410 may access this value from file 485, or this attribute for file 485, as appropriate when processing store command 455 to make the determination. Note that file 485 may include multiple values and/or attributes, each of which may specify differently whether block mode 330 or DAX mode 305 should be used. For example, file 485 may include a value and/or an attribute associated with each file being written and/or read, which value and/or attribute may indicate the appropriate mode to use for accessing data from that file.

In some embodiments of the disclosure, operating system 410 may determine the size of the data being accessed. If the size of the data being accessed satisfies a threshold (for example, if the number of blocks being written is greater than some threshold number), then operating system 410 may handle store command 455 using block mode 330; otherwise, operating system 410 may handle store command 455 using DAX mode 305.

In some embodiments of the disclosure, an Application Programming Interface (API) to make system calls to change the mode to be used. For example, application 405 may use an API to change an attribute of file 485 to change the mode between block mode 330 and DAX mode 305. APIs may also be used for other purposes.

In some embodiments of the disclosure, operating system 410 may use combinations of these approaches to determine whether to handle a particular command 455 using block mode 330 or DAX mode 305. Note too that operating system 410 may also use command 455 itself as part of the determination process: for example, if only store commands may be handled using block mode 330, then if command 455 is a load command, operating system 410 may hand command 455 using DAX mode 305, regardless of any other parameter, attribute, value, or size that might suggest that command 455 ought to be handled using block mode 455.

Because processor 110 of FIG. 1 may not block while write command 415 is being performed, processor 110 of FIG. 1 may execute other commands. But if these other commands were to include load/store commands 455, the result could be data inconsistency. For example, consider the situation where write command 415 is being performed, and load command 455 is received. If load command 455 requests data that is being written by the pending write command 415, then the data that is loaded may not be the data that was to be written using write command 415. To avoid this data inconsistency problem, in some embodiments of the disclosure load command 455 may be blocked while write command 415 is incomplete. In other embodiments of the disclosure, operating system 410 may determine whether load command 455 attempts to load data being written by write command 415, and may block load command 455 only if load command 455 attempts to load data being written by write command 415. In some embodiments of the disclosure, operating system 410 may similarly block store command 455 (to avoid the possibility of write command 415 and store command 455 both attempting to write data to the same file, which could leave the data in storage device 120 in an unknown state (either as written by write command 415, as written by store command 455, or partially written by write command 415 and partially written by store command 455).

In the description above, only load/store commands 455 are described as being potentially modified to use block mode 330: write commands 415 are presumed to be best handled by block mode 330. But embodiments of the disclosure may also support converting a block mode command to a DAX mode command. For example, operating system may receive write command 415, determine that the amount of data being written is small enough that there is little benefit to using block mode 330, and may modify the command to use DAX mode 305 instead. Similarly, operating system 410 may receive a read command from application 405 and may convert the read command into a load command to use DAX mode. In this manner, application 405 may avoid needing to determine (or attempt to determine) the best mode for a particular command: operating system 410 may make that determination: application 415 may issue read commands without concern that using a read command might result in data inconsistency.

Figure 5:
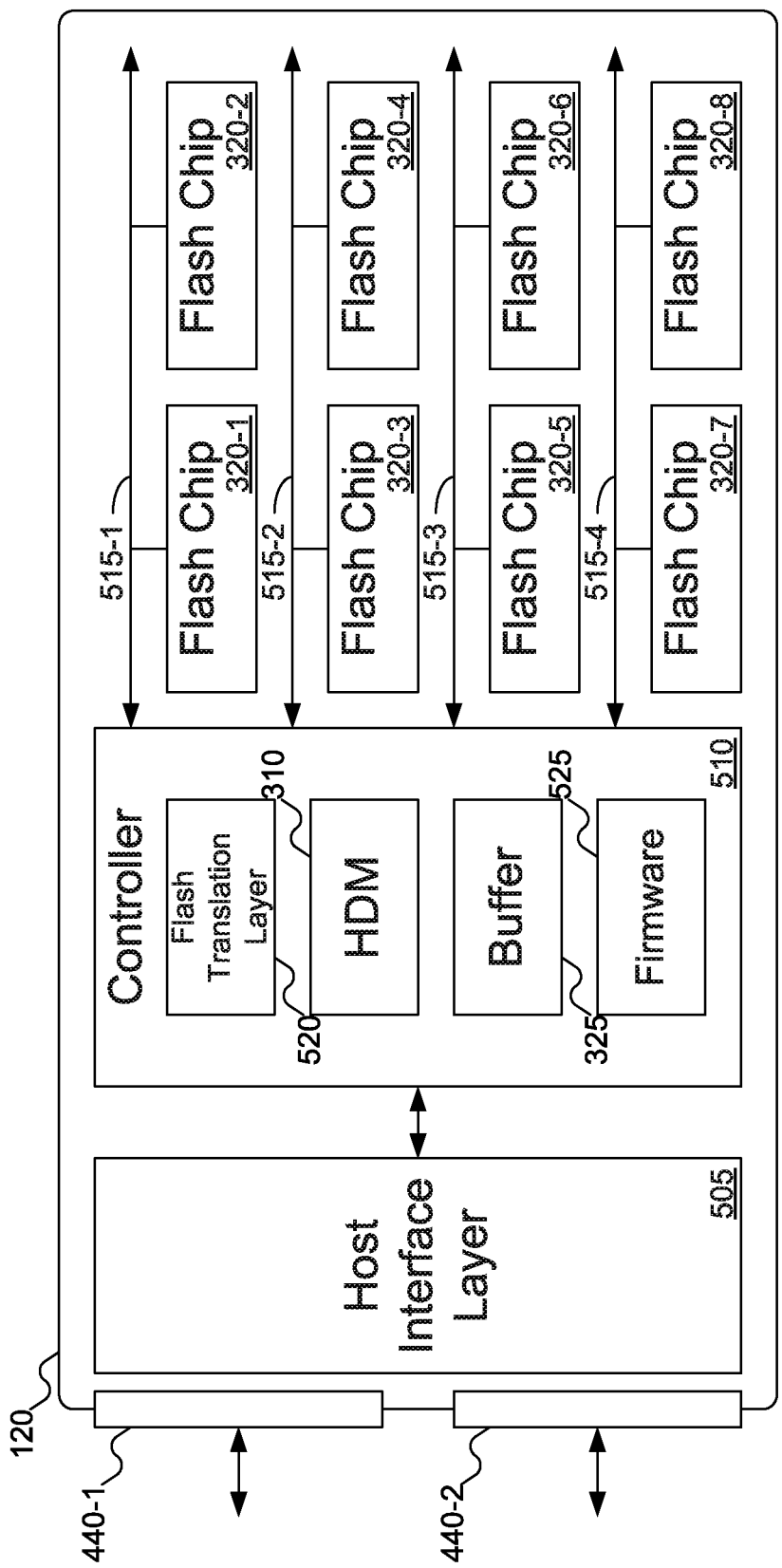
FIG. 5 shows a Solid State Drive (SSD) used to extend the memory of FIG. 1, according to embodiments of the disclosure.

FIG. 5 shows a Solid State Drive (SSD) used to extend memory 115 of FIG. 1, according to embodiments of the disclosure. In FIG. 5, SSD 120 may include interfaces 440-1 and 440-2. Interfaces 440-1 and 440-2 may be interfaces used to connect SSD 120 to machine 105 of FIG. 1. As shown, SSD 120 may include more than one interface 440-1 and 440-2: for example, one interface might be used for block-based read and write requests, and another interface might be used for DAX mode read and write requests. While FIG. 5 suggests that interfaces 440-1 and 440-2 are physical connections between SSD 120 and machine 105 of FIG. 1, interfaces 440-1 and 440-2 may also represent protocol differences that may be used across a common physical interface. For example, SSD 120 might be connected to machine 105 using a U.2 or an M.2 connector, but may support block-based requests and DAX mode requests: handling the different types of requests may be performed by different interface 440-1 and 440-2.

SSD 120 may also include host interface layer 505, which may manage interfaces 440-1 and 440-2. If SSD 120 includes more than one interface 440-1 and 440-2, a single host interface layer 505 may manage all interfaces, SSD 120 may include a host interface layer for each interface, or some combination thereof may be used.

SSD 120 may also include SSD controller 510, various channels 515-1, 515-2, 515-3, and 515-4, along which various flash memory chips 320-1, 320-2, 320-3, 320-4, 320-5, 320-6, 320-7, and 320-8 may be arrayed (flash memory chips 320-1 through 320-8 may be referred to collectively as flash memory chips 320). SSD controller 510 may manage sending read requests and write requests to flash memory chips 320-1 through 320-8 along channels 515-1 through 515-4 (which may be referred to collectively as channels 515). Although FIG. 5 shows four channels and eight flash memory chips, embodiments of the disclosure may include any number (one or more, without bound) of channels including any number (one or more, without bound) of flash memory chips.

Within each flash memory chip, the space may be organized into blocks, which may be further subdivided into pages, and which may be grouped into superblocks. Page sizes may vary as desired: for example, a page may be 4 KB of data. If less than a full page is to be written, the excess space is "unused". Blocks may contain any number of pages: for example, 128 or 256. And superblocks may contain any number of blocks. A flash memory chip might not organize data into superblocks, but only blocks and pages.

While pages may be written and read, SSDs typically do not permit data to be overwritten: that is, existing data may be not be replaced "in place" with new data. Instead, when data is to be updated, the new data is written to a new page on the SSD, and the original page is invalidated (marked ready for erasure). Thus, SSD pages typically have one of three states: free (ready to be written), valid (containing valid data), and invalid (no longer containing valid data, but not usable until erased) (the exact names for these states may vary).

But while pages may be written and read individually, the block is the basic unit of data that may be erased. That is, pages are not erased individually: all the pages in a block are typically erased at the same time. For example, if a block contains 256 pages, then all 256 pages in a block are erased at the same time. This arrangement may lead to some management issues for the SSD: if a block is selected for erasure that still contains some valid data, that valid data may need to be copied to a free page elsewhere on the SSD before the block may be erased. (In some embodiments of the disclosure, the unit of erasure may differ from the block: for example, it may be a superblock, which as discussed above may be a set of multiple blocks.)

Because the units at which data is written and data is erased differ (page vs. block), if the SSD waited until a block contained only invalid data before erasing the block, the SSD might run out of available storage space, even though the amount of valid data might be less than the advertised capacity of the SSD. To avoid such a situation, SSD controller 510 may include a garbage collection controller (not shown in FIG. 5). The function of the garbage collection may be to identify blocks that contain all or mostly all invalid pages and free up those blocks so that valid data may be written into them again. But if the block selected for garbage collection includes valid data, that valid data will be erased by the garbage collection logic (since the unit of erasure is the block, not the page). To avoid such data being lost, the garbage collection logic may program the valid data from such blocks into other blocks. Once the data has been programmed into a new block (and the table mapping LBAs to physical block addresses (PBAs) updated to reflect the new location of the data), the block may then be erased, returning the state of the pages in the block to a free state.

SSDs also have a finite number of times each cell may be written before cells may not be trusted to retain the data correctly. This number is usually measured as a count of the number of program/erase cycles the cells undergo. Typically, the number of program/erase cycles that a cell may support mean that the SSD will remain reliably functional for a reasonable period of time: for personal users, the user may be more likely to replace the SSD due to insufficient storage capacity than because the number of program/erase cycles has been exceeded. But in enterprise environments, where data may be written and erased more frequently, the risk of cells exceeding their program/erase cycle count may be more significant.

To help offset this risk, SSD controller 510 may employ a wear leveling controller (not shown in FIG. 5). Wear leveling may involve selecting data blocks to program data based on the blocks' program/erase cycle counts. By selecting blocks with a lower program/erase cycle count to program new data, the SSD may be able to avoid increasing the program/erase cycle count for some blocks beyond their point of reliable operation. By keeping the wear level of each block as close as possible, the SSD may remain reliable for a longer period of time.

SSD controller 510 may include flash translation layer (FTL) 520 (which may be termed more generally a translation layer, for storage devices that do not use flash storage), HDM 310, buffer 325, and firmware 525. FTL 520 may handle translation of LBAs or other logical IDs (as used by processor 110 of FIG. 1) and physical block addresses (PBAs) or other physical addresses where data is stored in flash chips 320-1 through 320-8. FTL 520, may also be responsible for relocating data from one PBA to another, as may occur when performing garbage collection and/or wear leveling. HDM 310 and buffer 320 are discussed with reference to FIG. 3 above. Firmware 525 may be stored on an appropriate hardware module (such as a Programmable Read Only Memory PROM), an Erasable PROM (EPROM), and Electrically Erasable PROM (EEPROM), or some other variant thereof. Firmware 525 may be responsible for managing what data is in buffer 325, and may flush data from buffer 325 to flash memory chips 320 and load data from flash memory chips 320 into buffer 325.

Figure 6A:
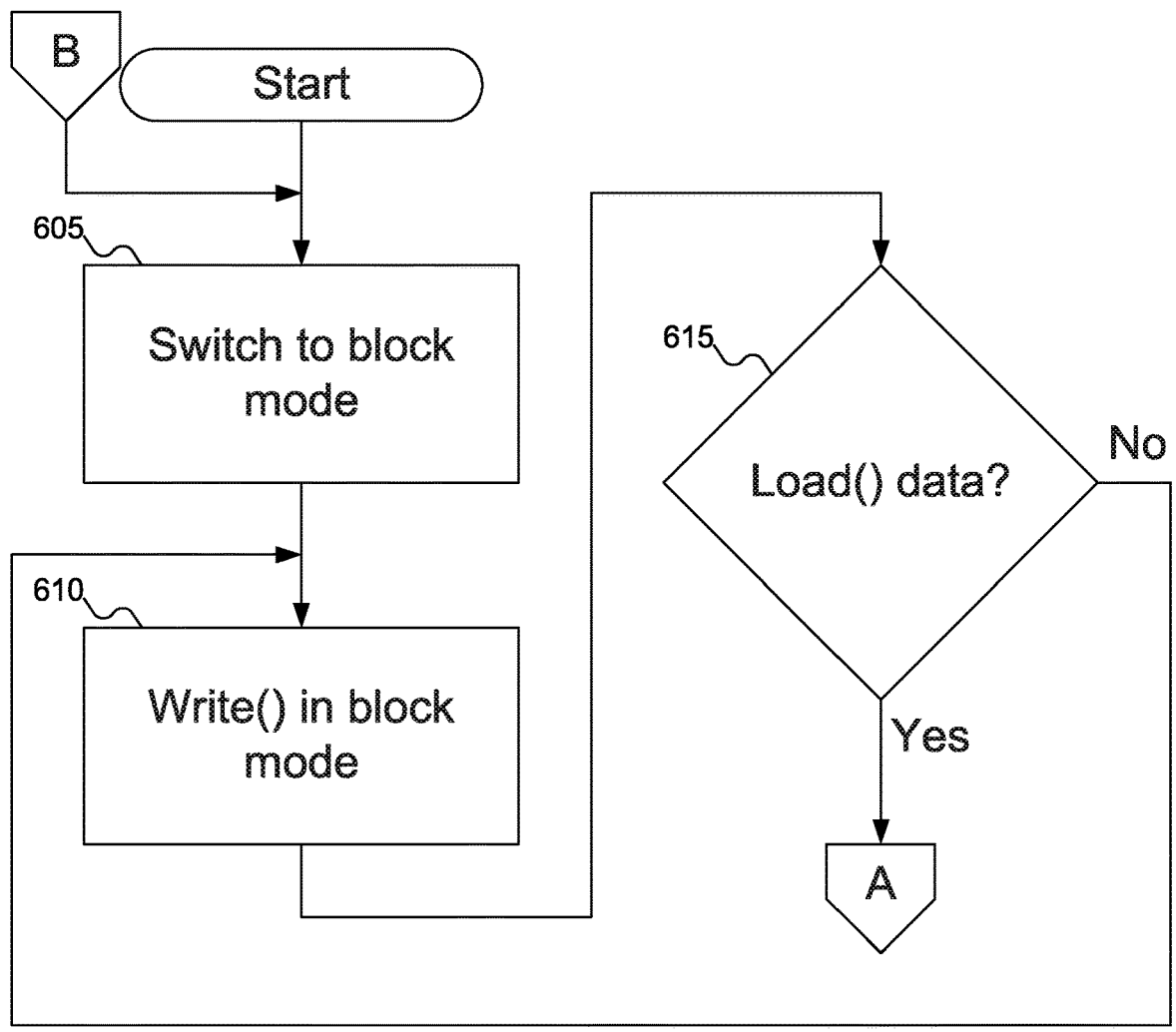
FIG. 6A shows a flowchart of an example procedure for the operating system of FIG. 4 to switch between modes in communicating with the storage device of FIG. 1, according to embodiments of the disclosure.

FIG. 6A shows a flowchart of an example procedure for operating system 410 of FIG. 4 to switch between modes in communicating with storage device 120 of FIG. 1, according to embodiments of the disclosure. In FIG. 6A, at block 605, operating system 410 of FIG. 4 may switch to block mode 330 of FIG. 3: for example, if application 405 of FIG. 4 issues write command 415 of FIG. 4, or if operating system 410 of FIG. 4 determines that store command 455 of FIG. 4 should be processed using block mode 330 of FIG. 3. At block 610, operating system 410 of FIG. 4 may process the command as write command 415 of FIG. 4 in block mode 330 of FIG. 3.

At block 615, operating system 410 of FIG. 4 may determine whether application 405 of FIG. 4 has issued load command 455 of FIG. 4 (or if operating system 410 of FIG. 4 determines that a further store command 455 of FIG. 4 should be processed using DAX mode 305 of FIG. 3. If not, then processing may return to block 610 to handle further write commands in block mode 330 of FIG. 3.

Figure 6B:
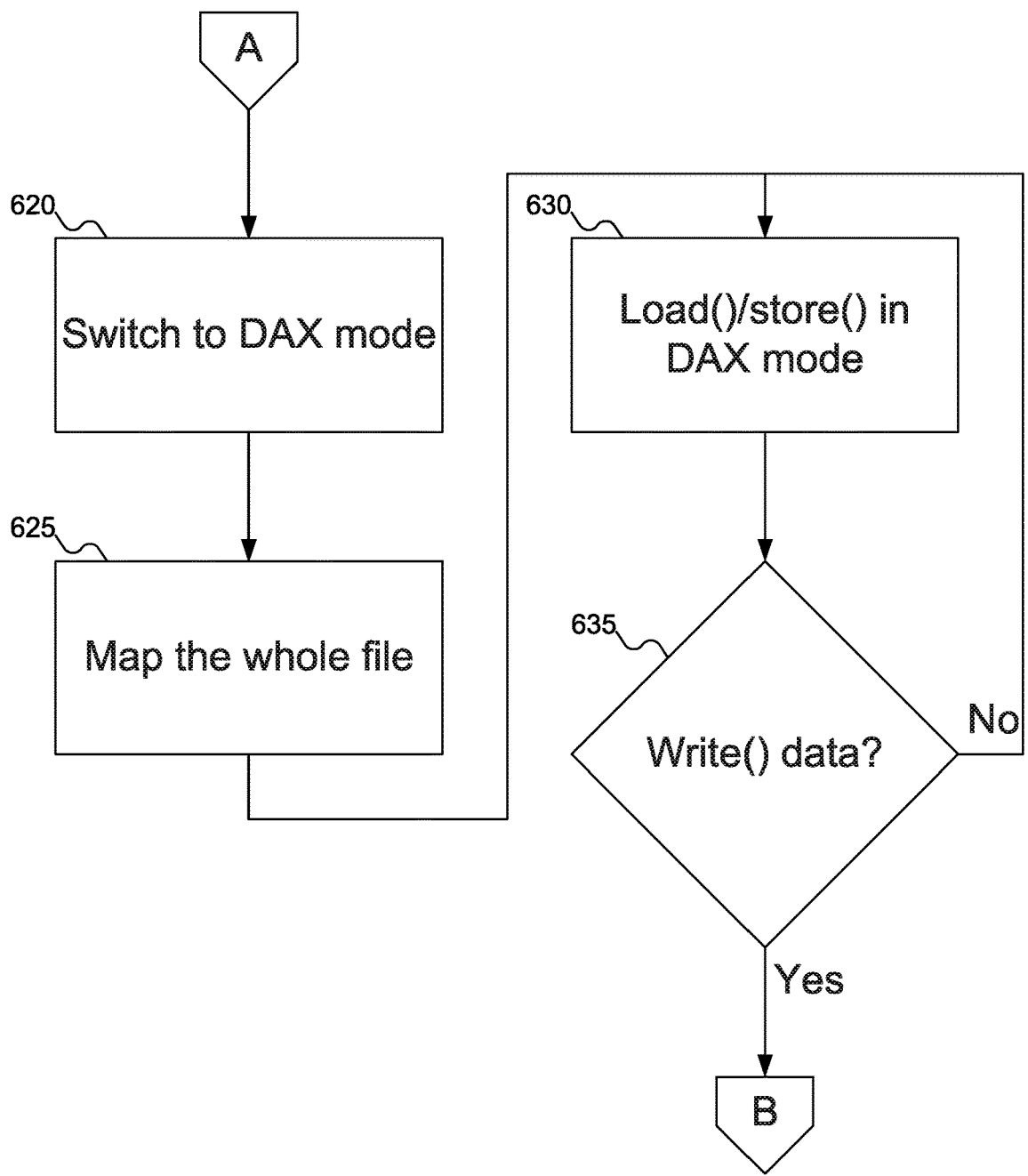
FIG. 6B continues the flowchart of FIG. 6A for the operating system of FIG. 4 to switch between modes in communicating with the storage device of FIG. 1, according to embodiments of the disclosure.

But if application 405 of FIG. 4 issues load command 455, or if operating system 410 of FIG. 4 determines that store command 455 is to be handled using DAX mode 305 of FIG. 3, then at block 620 (FIG. 6B) operating system 410 of FIG. 4 may switch to DAX mode 305 of FIG. 3. At block 625, operating system 410 of FIG. 4 may map the file being loaded by application 405 of FIG. 4. This process may involve determining one or more virtual addresses that may be used by application 405 of FIG. 4 and the associated physical addresses in the extended memory system where the data is stored, and configuring the page table for application 405 of FIG. 4 accordingly. At block 630, operating system 410 of FIG. 4 may send load/store command 455 of FIG. 4 to storage device 120 of FIG. 1.

Finally, at block 635, operating system 410 of FIG. 4 may determine whether application 405 of FIG. 4 has issued write command 415 of FIG. 4 (or if operating system 410 of FIG. 4 determines that a further store command 455 of FIG. 4 should be processed using block mode 330 of FIG. 3. If not, then processing may return to block 630 to handle further load/store commands in DAX mode 305 of FIG. 3. Otherwise, processing may return to block 605 of FIG. 6A to process write commands in block mode 330 of FIG. 3.

Figure 7:
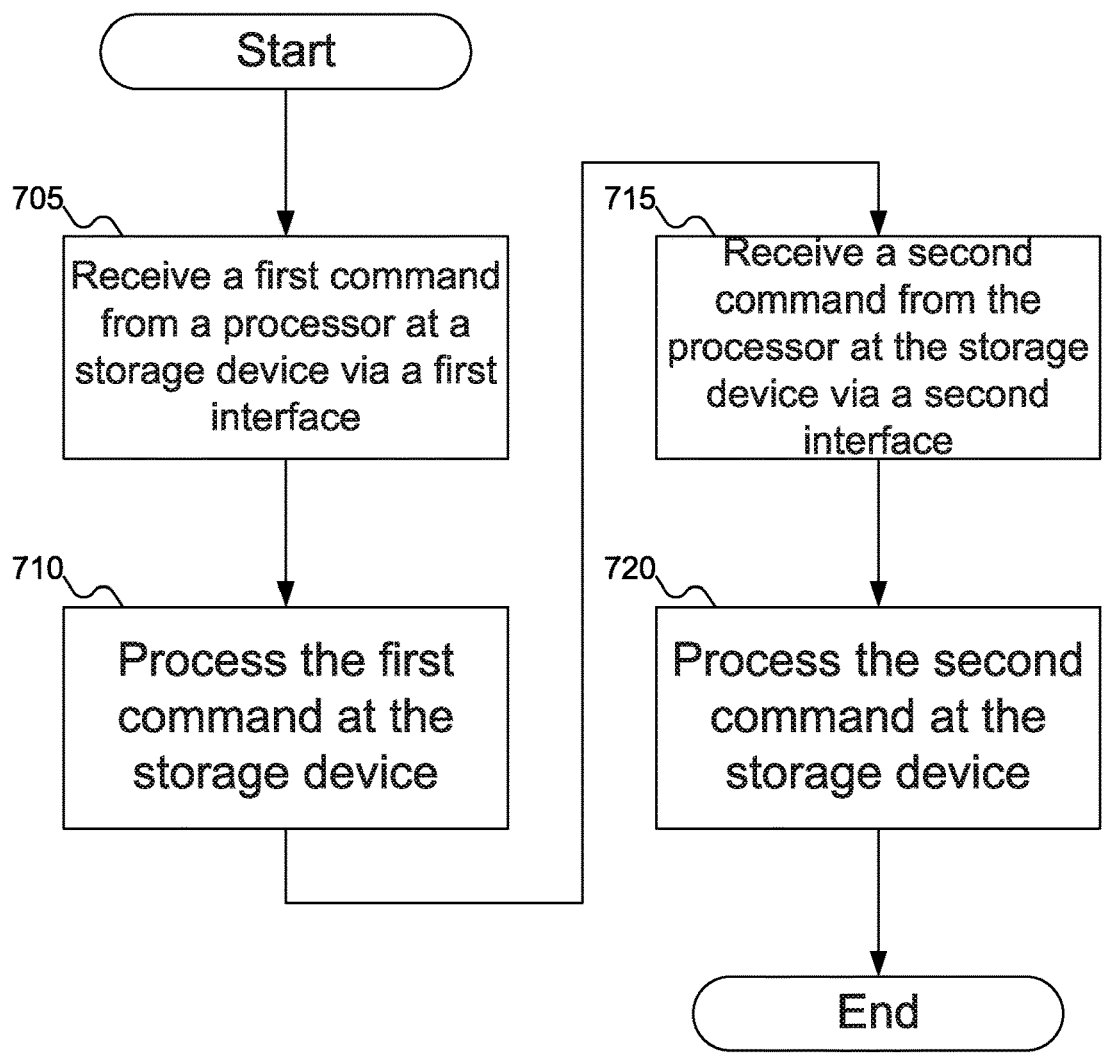
FIG. 7 shows a flowchart of an example procedure for the storage device of FIG. 1 to receive commands using two modes, according to embodiments of the disclosure.

FIG. 7 shows a flowchart of an example procedure for storage device 120 of FIG. 1 to receive commands using two modes, according to embodiments of the disclosure. In FIG. 7, at block 705, storage device 120 of FIG. 1 may receive command 455 of FIG. 4 via interface 440-2 of FIG. 4. At block 710, controller 510 of FIG. 5 may process command 455 of FIG. 4. At block 715, storage device 120 of FIG. 1 may receive command 415 of FIG. 4 via interface 440-1 of FIG. 4. At block 720, controller 510 of FIG. 5 may process command 415 of FIG. 4.

Figure 8A:
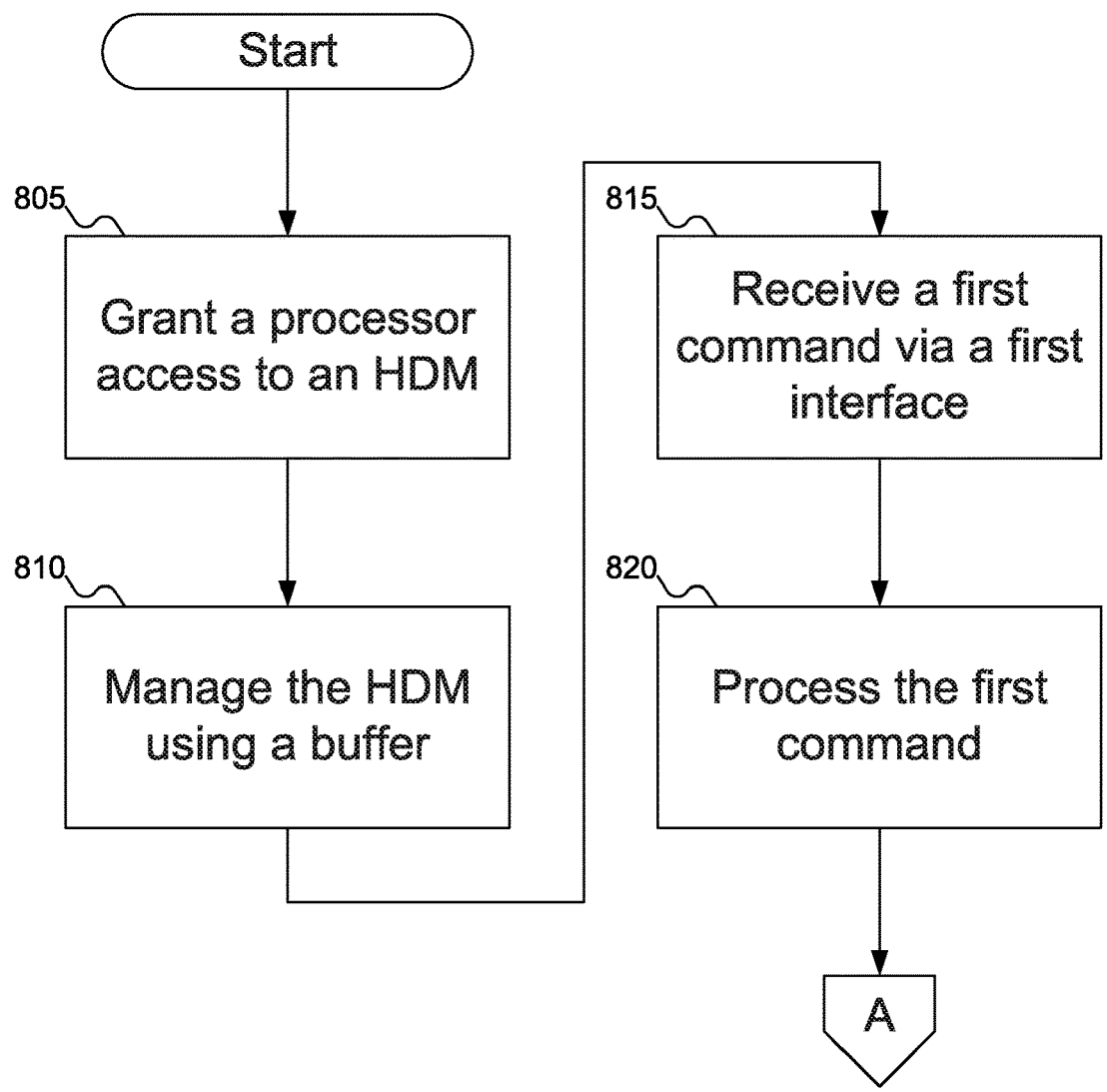
FIG. 8A shows a flowchart of an alternative example procedure for the storage device of FIG. 1 to receive commands using two modes, according to embodiments of the disclosure.

FIG. 8A shows a flowchart of an alternative example procedure for storage device 120 of FIG. 1 to receive commands using two modes, according to embodiments of the disclosure. In FIG. 8A, at block 805, storage device 120 of FIG. 1 may grant processor 110 of FIG. 1 access to HDM 310 of FIG. 3. At block 810, storage device 120 of FIG. 1 may manage HDM 310 of FIG. 3 using buffer 325 of FIG. 3. This management may include firmware 525 of FIG. 5 managing data consistency between buffer 325 of FIG. 3 and storage 320 of FIG. 3.

At block 815, storage device 120 of FIG. 1 may receive command 455 of FIG. 4 via interface 440-2 of FIG. 4. At block 820, storage device 120 of FIG. 1 may process command 455 of FIG. 4 using controller 510 of FIG. 5. For example, controller 510 of FIG. 5 may perform load/store operations on buffer 325 of FIG. 1, and may also write data to storage 320 of FIG. 3 or read data from storage 320 of FIG. 3.

Figure 8B:
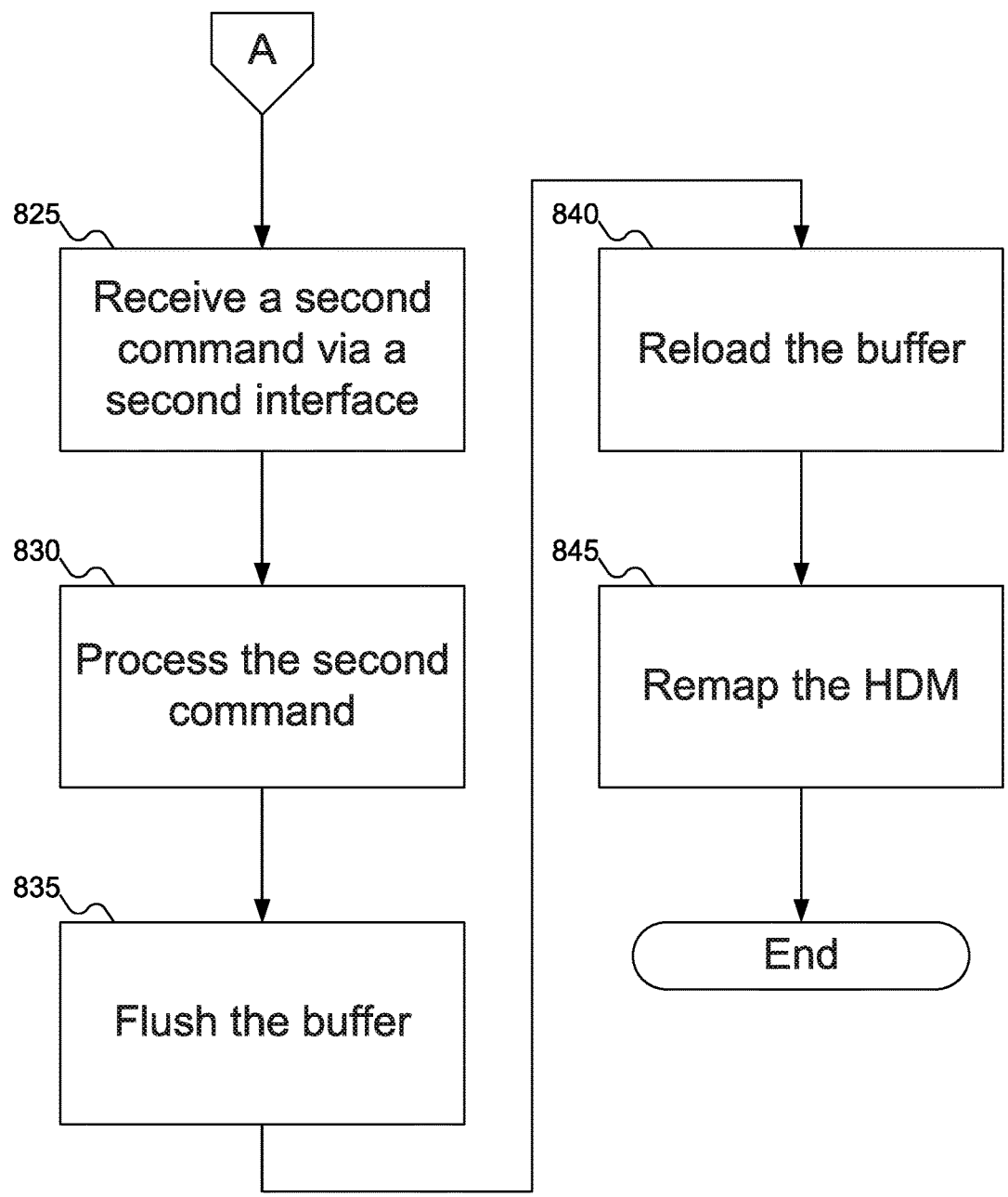
FIG. 8B continues the flowchart of FIG. 8A for the storage device of FIG. 1 to receive commands using two modes, according to embodiments of the disclosure.

At block 825 (FIG. 8B), storage device 120 of FIG. 1 may receive command 415 of FIG. 4 via interface 440-1 of FIG. 4. At block 830, storage device 120 of FIG. 1 may process command 415 of FIG. 4 using controller 510 of FIG. 5. For example, controller 510 of FIG. 5 may perform a write command for data to storage 320 of FIG. 3.

Because write command 415 of FIG. 4 may update data that is stored in buffer 325 of FIG. 3, at block 835, storage device 120 of FIG. 1 may flush buffer 325 of FIG. 3, to ensure that any data in buffer 325 of FIG. 3 that has been updated is written to storage 320 of FIG. 3. At block 840, storage device 120 of FIG. 1 may reload buffer 325 of FIG. 3 with data from storage 320 of FIG. 3. Finally, at block 845, because buffer 325 of FIG. 3 may have been updated with new data, storage device 120 of FIG. 1 may remap HDM 310 of FIG. 3 to buffer 325 of FIG. 3 to reflect the updated data, particularly if the size of a file is changed.

Figure 9:
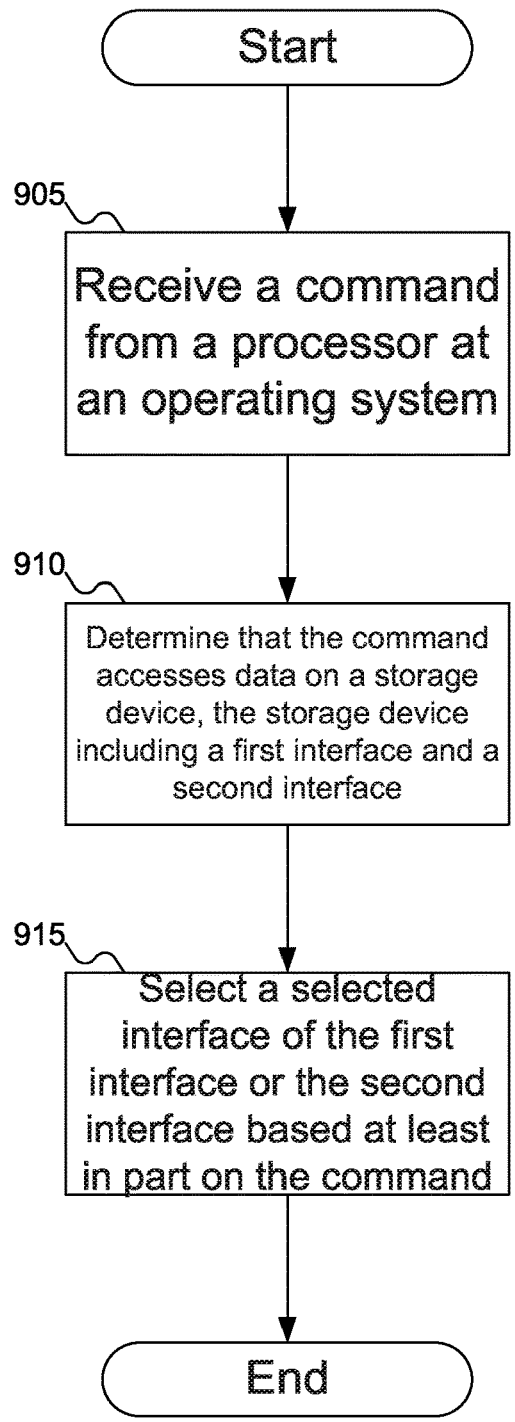
FIG. 9 shows a flowchart of an example procedure for the operating system of FIG. 4 to send commands to the storage device of FIG. 1 using two modes, according to embodiments of the disclosure.

FIG. 9 shows a flowchart of an example procedure for operating system 410 of FIG. 4 to send commands to storage device 120 of FIG. 1 using two modes, according to embodiments of the disclosure. In FIG. 9, at block 905, operating system 410 of FIG. 4 may receive command 415 of FIG. 4 or command 455 of FIG. 4 from processor 110 of FIG. 1. At block 910, operating system 410 of FIG. 4 may determine whether command 415 of FIG. 4 or command 455 of FIG. 4 should be handled using block mode 330 of FIG. 3 or DAX mode 305 of FIG. 3. At block 915, operating system 410 of FIG. 4 may then select interface 440-1 or 440-2 of FIG. 4 of storage device 120 of FIG. 1. The selection of interface 440-1 or 440-2 of FIG. 4 may depend on command 415 of FIG. 4 or command 455 of FIG. 4, among other possible information. For example, as discussed above with reference to FIG. 4, if application 405 of FIG. 4 issues write command 415, then block mode 330 of FIG. 3 may be used, which may lead to the selection of interface 440-1 of FIG. 4; if application 405 of FIG. 4 issues load/store command 455, then either block mode 330 of FIG. 3 or block mode 305 of FIG. 3 may be used, depending on mode switch 475 of FIG. 4, which may lead to the selection of either interface 440-1 of FIG. 4 or interface 440-2 of FIG. 4.

Figure 10:
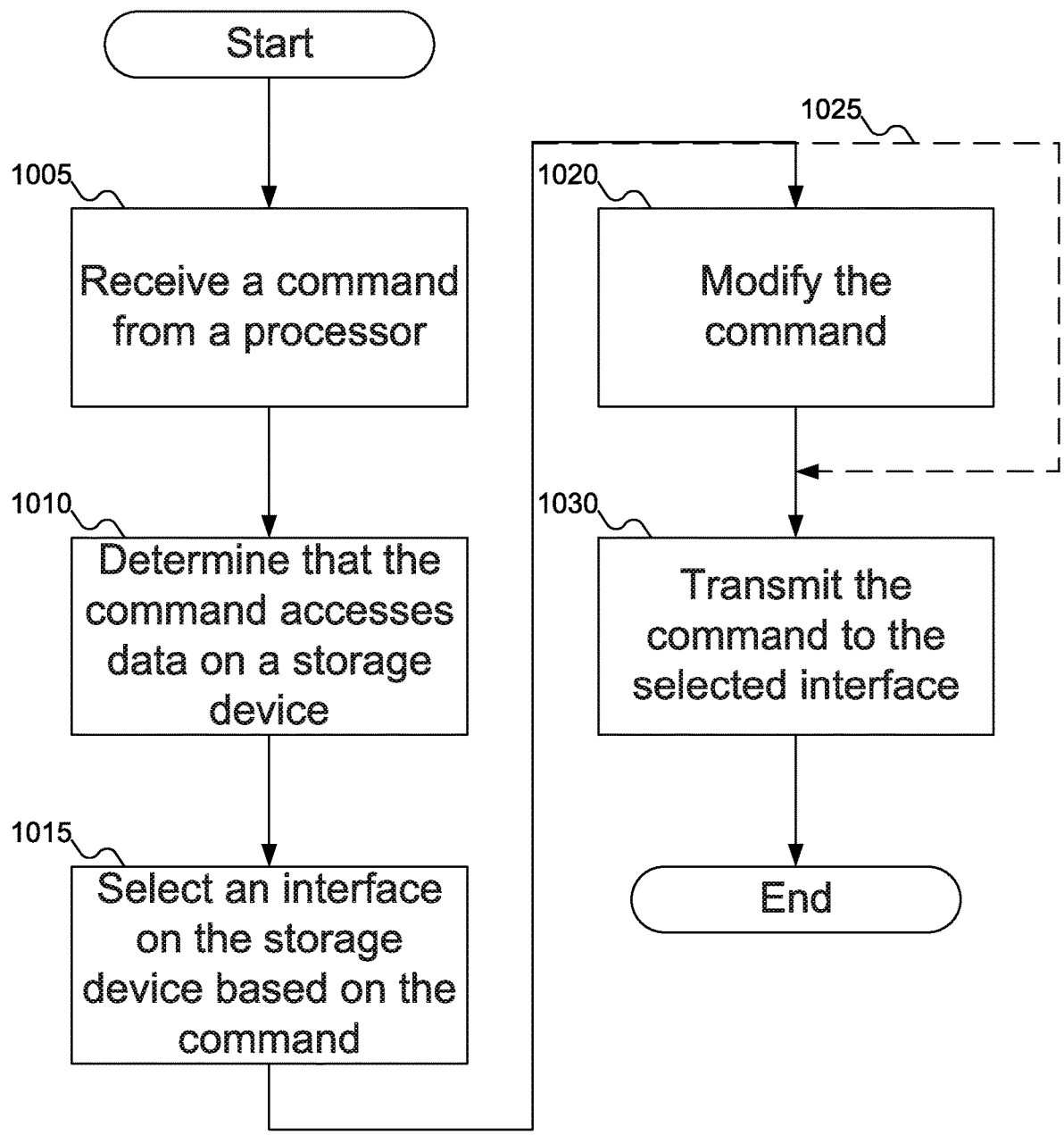
FIG. 10 shows a flowchart of an alternative example procedure for the operating system of FIG. 4 to send commands to the storage device of FIG. 1 using two modes, according to embodiments of the disclosure.

FIG. 10 shows a flowchart of an alternative example procedure for operating system 410 of FIG. 4 to send commands to storage device 120 of FIG. 1 using two modes, according to embodiments of the disclosure. In FIG. 10, at block 1005, operating system 410 of FIG. 4 may receive command 415 of FIG. 4 or command 455 of FIG. 4 from processor 110 of FIG. 1. At block 1010, operating system 410 of FIG. 4 may determine that command 415 of FIG. 4 or command 455 of FIG. 4 accesses data from storage device 120 of FIG. 1 (for example, the command might be a command that may be processed within operating system 410 of FIG. 4, without accessing data from storage device 120 of FIG. 1). At block 1015, operating system 410 of FIG. 4 may then select interface 440-1 or 440-2 of FIG. 4 of storage device 120 of FIG. 1. The selection of interface 440-1 or 440-2 of FIG. 4 may depend on command 415 of FIG. 4 or command 455 of FIG. 4, among other possible information. At block 1020, modifier 480 of FIG. 4 may modify command 455 of FIG. 4 to be in a format that looks like command 415 of FIG. 4. For example, modifier 480 of FIG. 4 may replace the command name of command 455 of FIG. 4 with the command name of command 415 of FIG. 4, and may replace the physical address of command 455 of FIG. 4 with the LBA associated with the data to be written as expected by storage device 120 of FIG. 1. Modifier 480 of FIG. 4 may also modify the reorder parameters in the command, and may modify how the command and data are packaged (e.g., packetized) for transmission to storage device 120 of FIG. 1. Block 1020 may be omitted, as shown by dashed line 1025. Finally, at block 1030, transmitter 435 of FIG. 4 may transmit the command (modified or not) to selected interface 440-1 or 440-2 of FIG. 4.

In FIGS. 6A-10, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

The Dual Mode Solid State Drive (SSD) may support host-managed device memory (HDM) memory (that is, memory of the Dual Mode SSD that the host central processing unit (CPU) may access via the CXL.mem protocol) registration when the device is enumerated. For example, if the Dual Mode SSD is configured (in device firmware) to define an HDM of 250 GB, then the host CPU can see 250 GB of memory in the device.

The Dual Mode SSD may support memory access via CXL.mem and may support DMA engine for CXL.io.

The Dual Mode SSD may be designed to support two modes, memory access mode and storage access mode. The memory access mode may support CXL.mem, and the storage access model may support Peripheral Component Interconnect Express (PCIe). CXL.io may be used to access control registers and CXL configuration space.

A device driver may support an integrated device driver for both Non-Volatile Memory Express (NVMe) and CXL protocols.

In fsdax mode using a Non-Volatile Dual In-Line Memory Module (NVDIMM), the SSD may support two modes: block and dax mode. Block mode may enable read( ) and write( ) on direct memory access (DMA) via PCIe. DAX mode may enable load/store by CPU via CXL.mem. This approach may have some data consistency issues due to maintaining two device access paths. In order to avoid the consistency issues, the SSD can include some principles for file system and memory access. The Dual Mode SSD may not permit "read( )" via PCIe.

An application may create a file and may set its mode. If the application sets the file as a block mode, write( ) operations may be done by page cache on the filesystem, and actual data transfer may be done by DMA via an NVMe device driver. If the application sets the file as a dax mode, the application may invoke mmap( ) and may submit load/store commands via CXL.mem.

The file system may maintain metadata and should track the changes on the file. If the file is changed by CXL.mem, the metadata may become corrupt. To avoid this concern: (i) the application may "write" with block mode when the total number of blocks change in the given file exceeds a threshold; (ii) the application may "load" and "store" with dax mode only; (iii) the "store" on dax mode may be for mapped pages only: the SSD may not allow to map additional pages to "store" via CXL.mem; (iv) remapping on dax mode may be required when "write" in block mode changes the size of file; and (v) "load" by CXL.mem may not be allowed when 'write' by PCIe is not completed.

The Dual Mode SSD may operate as a memory device, not a storage device.

The Dual Mode SSD may provide a huge size memory extension (equivalent with SSD capacity) with lower performance against DRAM. This tradeoff may be efficient for some memory size bounded applications.

The reason to maintain dual mode is because bulk data transfer via DMA (storage access) may be faster than writing via CXL.mem (memory access mode).

Software may support Application Programming Interfaces (APIs) on fsdax using NVDIMM.

Embodiments of the disclosure include a storage device that may support dual mode access. If a command sent to a storage device may be better served using block mode access, the command may be sent as a block mode command. If a command sent to the storage device may be better served using DAX mode, the command may be sent as a DAX mode command. The operating system may determine the best mode for the command based on the command itself, an operating system parameter, a file value, a file attribute, or the size of the data being accessed. Once the operating system has determined the best mode, the operating system may select an appropriate interface on the dual mode storage device, to which the command may be delivered.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
  a processor;
  a memory coupled to the processor;
  a storage device coupled to the processor, the storage device including a first interface and a second interface, the storage device configured to extend the memory; and
  a mode switch to select a selected interface of the first interface and the second interface for a command issued by the processor.

Statement 2. An embodiment of the disclosure includes the system according to statement 1, wherein the storage device includes:
  storage for a data;
  a controller to manage the data in the storage;
  wherein the controller is configured to process the command.

Statement 3. An embodiment of the disclosure includes the system according to statement 2, wherein the storage device further includes:
  a host-managed device memory (HDM); and
  a buffer mapped from the HDM,
  wherein the processor may access the HDM; and
  the buffer may store a copy of a portion of the storage.

Statement 4. An embodiment of the disclosure includes the system according to statement 1, wherein the storage device includes a Solid State Drive (SSD).

Statement 5. An embodiment of the disclosure includes the system according to statement 4, wherein the mode switch is configured to select the one of the first interface and the second interface for the command issued by the processor based at least in part on one of a parameter of the operating system, a second data in a file, a metadata of the file, or a type of the command, a data size associated with the command.

Statement 6. An embodiment of the disclosure includes the system according to statement 4, further comprising a transmitter to transmit the command to the SSD using the selected interface.

Statement 7. An embodiment of the disclosure includes the system according to statement 6, further comprising a modifier to modify the command based at least in part on the selected interface.

Statement 8. An embodiment of the disclosure includes the system according to statement 7, wherein the modifier is configured to replace the command with a second command based at least in part on the selected interface, the second command different from the command.

Statement 9. An embodiment of the disclosure includes the system according to statement 7, wherein the modifier is configured to replace a first parameter of the command with a second parameter of the command based at least in part on the selected interface, the second parameter different from the first parameter.

Statement 10. An embodiment of the disclosure includes the system according to statement 7, wherein the modifier is configured to change a packaging of the command based at least in part on the selected interface.

Statement 11. An embodiment of the disclosure includes the system according to statement 4, wherein the first interface includes a cache-coherent interconnect protocol.

Statement 12. An embodiment of the disclosure includes the system according to statement 11, wherein the cache-coherent interconnect protocol includes a Compute Express Link (CXL) protocol.

Statement 13. An embodiment of the disclosure includes the system according to statement 4, wherein the second interface includes a block interface.

Statement 14. An embodiment of the disclosure includes the system according to statement 13, wherein the block interface includes a Peripheral Component Interconnect Express (PCIe) interface.

Statement 15. An embodiment of the disclosure includes a storage device, comprising: storage for a data;
  a controller to manage the data in the storage;
  a first interface to receive a first command from a processor; and
  a second interface to receive a second command from the host processor,
  wherein the controller is configured to process the first command and the second command, and
  wherein the storage device extends a memory.

Statement 16. An embodiment of the disclosure includes the storage device according to statement 15, further comprising:
- a host-managed device memory (HDM); and
- a buffer mapped from the HDM,
- wherein the processor may access the HDM; and
- the buffer may store a copy of a portion of the storage.

Statement 17. An embodiment of the disclosure includes the storage device according to statement 16, further comprising a non-transitory storage medium including instructions to flush the buffer and reload the buffer based at least in part on the storage device receiving the second command.

Statement 18. An embodiment of the disclosure includes the storage device according to statement 15, wherein the storage device includes a Solid State Drive (SSD).

Statement 19. An embodiment of the disclosure includes the storage device according to statement 18, wherein the first interface includes a cache-coherent interconnect protocol.

Statement 20. An embodiment of the disclosure includes the storage device according to statement 19, wherein the cache-coherent interconnect protocol includes a Compute Express Link (CXL) protocol.

Statement 21. An embodiment of the disclosure includes the storage device according to statement 18, wherein the second interface includes a block interface.

Statement 22. An embodiment of the disclosure includes the storage device according to statement 21, wherein the block interface includes a Peripheral Component Interconnect Express (PCIe) interface.

Statement 23. An embodiment of the disclosure includes the storage device according to statement 18, wherein the first command includes one of a load command or a store command.

Statement 24. An embodiment of the disclosure includes the storage device according to statement 18, wherein the second command includes a write command.

Statement 25. An embodiment of the disclosure includes the storage device according to statement 18, wherein the second command includes a read command.

Statement 26. An embodiment of the disclosure includes a method, comprising:
- receiving a command from a processor at an operating system;
- determining that the command accesses data on a storage device, the storage device including a first interface and a second interface; and
- selecting a selected interface of the first interface or the second interface based at least in part on the command, wherein the storage device is configured to extend a memory.

Statement 27. An embodiment of the disclosure includes the method according to statement 26, wherein determining that the command accesses data on the storage device includes determining that the command accesses data on a Solid State Drive (SSD).

Statement 28. An embodiment of the disclosure includes the method according to statement 27, wherein the first interface includes a cache-coherent interconnect protocol.

Statement 29. An embodiment of the disclosure includes the method according to statement 28, wherein the cache-coherent interconnect protocol includes a Compute Express Link (CXL) protocol.

Statement 30. An embodiment of the disclosure includes the method according to statement 27, wherein the second interface includes a block interface.

Statement 31. An embodiment of the disclosure includes the method according to statement 30, wherein the block interface includes a Peripheral Component Interconnect Express (PCIe) interface.

Statement 32. An embodiment of the disclosure includes the method according to statement 27, wherein determining that the command accesses data on the SSD includes determining that the command accesses a host-managed device memory (HDM) of the SSD.

Statement 33. An embodiment of the disclosure includes the method according to statement 27, wherein selecting the selected interface of the first interface and the second interface based at least in part on the command includes selecting the selected interface of the first interface or the second interface based at least in part one of a parameter of the operating system, a second data in a file, a metadata of the file, or a type of the command, a data size associated with the command.

Statement 34. An embodiment of the disclosure includes the method according to statement 27, further comprising transmitting the command to the SSD using the selected interface.

Statement 35. An embodiment of the disclosure includes the method according to statement 34, wherein transmitting the command to the SSD using the selected interface includes modifying the command based at least in part on the selected interface.

Statement 36. An embodiment of the disclosure includes the method according to statement 35, wherein modifying the command based at least in part on the selected interface includes replacing the command with a second command based at least in part on the selected interface, the second command different from the command.

Statement 37. An embodiment of the disclosure includes the method according to statement 35, wherein the modifying the command based at least in part on the selected interface includes replacing a first parameter of the command with a second parameter of the command based at least in part on the selected interface, the second parameter different from the first parameter.

Statement 38. An embodiment of the disclosure includes the method according to statement 35, wherein the modifying the command based at least in part on the selected interface includes changing a packaging of the command based at least in part on the selected interface.

Statement 39. An embodiment of the disclosure includes a method, comprising:
- receiving a first command from a processor at a storage device via a first interface;
- processing the first command at the storage device;
- receiving a second command from the processor at the storage device via a second interface; and
- processing the second command at the storage device.

Statement 40. An embodiment of the disclosure includes the method according to statement 39, wherein:
- receiving the first command from the processor at the storage device via the first interface includes receiving the first command from the processor at a Solid State Drive (SSD) via the first interface;
- processing the second command at the storage device includes processing the second command at the SSD;
- receiving the second command from the processor at the storage device via the second interface includes receiving the second command from the processor at the SSD via the second interface; and
- processing the second command at the storage device includes processing the second command at the SSD.

Statement 41. An embodiment of the disclosure includes the method according to statement 40, wherein the first interface includes a cache-coherent interconnect protocol.

Statement 42. An embodiment of the disclosure includes the method according to statement 41, wherein the cache-coherent interconnect protocol includes a Compute Express Link (CXL) protocol.

Statement 43. An embodiment of the disclosure includes the method according to statement 40, wherein the second interface includes a block interface.

Statement 44. An embodiment of the disclosure includes the method according to statement 43, wherein the block interface includes a Peripheral Component Interconnect Express (PCIe) interface.

Statement 45. An embodiment of the disclosure includes the method according to statement 40, wherein receiving the first command at the SSD via the first interface includes:
  granting access to a host-managed device memory (HDM) in the SSD by the processor; and
  managing the HDM to a buffer in the SSD.

Statement 46. An embodiment of the disclosure includes the method according to statement 40, wherein the first command includes one of a load command or a store command.

Statement 47. An embodiment of the disclosure includes the method according to statement 40, wherein receiving the second command from the processor at the SSD via the second interface includes:
  flushing a buffer in the SSD; and
  reloading the buffer.

Statement 48. An embodiment of the disclosure includes the method according to statement 47, wherein receiving the second command from the processor at the SSD via the second interface further includes remapping an HDM in the SSD to the buffer.

Statement 49. An embodiment of the disclosure includes the method according to statement 40, wherein the second command includes a write command.

Statement 50. An embodiment of the disclosure includes the method according to statement 40, wherein the second command includes a read command.

Statement 51. An embodiment of the disclosure includes an article, comprising a non-transitory storage medium, the non-transitory storage medium having stored thereon instructions that, when executed by a machine, result in:
  receiving a command from a processor at an operating system;
  determining that the command accesses data on a storage device, the storage device including a first interface and a second interface; and
  selecting a selected interface of the first interface or the second interface based at least in part on the command, wherein the storage device is configured to extend a memory.

Statement 52. An embodiment of the disclosure includes the article according to statement 51, wherein determining that the command accesses data on the storage device includes determining that the command accesses data on a Solid State Drive (SSD).

Statement 53. An embodiment of the disclosure includes the article according to statement 52, wherein the first interface includes a cache-coherent interconnect protocol.

Statement 54. An embodiment of the disclosure includes the article according to statement 53, wherein the cache-coherent interconnect protocol includes a Compute Express Link (CXL) protocol.

Statement 55. An embodiment of the disclosure includes the article according to statement 52, wherein the second interface includes a block interface.

Statement 56. An embodiment of the disclosure includes the article according to statement 55, wherein the block interface includes a Peripheral Component Interconnect Express (PCIe) interface.

Statement 57. An embodiment of the disclosure includes the article according to statement 52, wherein determining that the command accesses data on the SSD includes determining that the command accesses a host-managed device memory (HDM) of the SSD.

Statement 58. An embodiment of the disclosure includes the article according to statement 52, wherein selecting the selected interface of the first interface and the second interface based at least in part on the command includes selecting the selected interface of the first interface or the second interface based at least in part one of a parameter of the operating system, a second data in a file, a metadata of the file, or a type of the command, a data size associated with the command.

Statement 59. An embodiment of the disclosure includes the article according to statement 52, the non-transitory storage medium having stored thereon further instructions that, when executed by the machine, result in transmitting the command to the SSD using the selected interface.

Statement 60. An embodiment of the disclosure includes the article according to statement 59, wherein transmitting the command to the SSD using the selected interface includes modifying the command based at least in part on the selected interface.

Statement 61. An embodiment of the disclosure includes the article according to statement 60, wherein modifying the command based at least in part on the selected interface includes replacing the command with a second command based at least in part on the selected interface, the second command different from the command.

Statement 62. An embodiment of the disclosure includes the article according to statement 60, wherein the modifying the command based at least in part on the selected interface includes replacing a first parameter of the command with a second parameter of the command based at least in part on the selected interface, the second parameter different from the first parameter.

Statement 63. An embodiment of the disclosure includes the article according to statement 60, wherein the modifying the command based at least in part on the selected interface includes changing a packaging of the command based at least in part on the selected interface.

Statement 64. An embodiment of the disclosure includes an article, comprising a non-transitory storage medium, the non-transitory storage medium having stored thereon instructions that, when executed by a machine, result in:
  receiving a first command from a processor at a storage device via a first interface;
  processing the first command at the storage device;
  receiving a second command from the processor at the storage device via a second interface; and
  processing the second command at the storage device.

Statement 65. An embodiment of the disclosure includes the article according to statement 64, wherein:
  receiving the first command from the processor at the storage device via the first interface includes receiving the first command from the processor at a Solid State Drive (SSD) via the first interface;
  processing the second command at the storage device includes processing the second command at the SSD;

receiving the second command from the processor at the storage device via the second interface includes receiving the second command from the processor at the SSD via the second interface; and processing the second command at the storage device includes processing the second command at the SSD.

Statement 66. An embodiment of the disclosure includes the article according to statement 65, wherein the first interface includes a cache-coherent interconnect protocol.

Statement 67. An embodiment of the disclosure includes the article according to statement 66, wherein the cache-coherent interconnect protocol includes a Compute Express Link (CXL) protocol.

Statement 68. An embodiment of the disclosure includes the article according to statement 65, wherein the second interface includes a block interface.

Statement 69. An embodiment of the disclosure includes the article according to statement 68, wherein the block interface includes a Peripheral Component Interconnect Express (PCIe) interface.

Statement 70. An embodiment of the disclosure includes the article according to statement 65, wherein receiving the first command at the SSD via the first interface includes:

granting access to a host-managed device memory (HDM) in the SSD by the processor; and managing the HDM to a buffer in the SSD.

Statement 71. An embodiment of the disclosure includes the article according to statement 65, wherein the first command includes one of a load command or a store command.

Statement 72. An embodiment of the disclosure includes the article according to statement 65, wherein receiving the second command from the processor at the SSD via the second interface includes:

flushing a buffer in the SSD; and reloading the buffer.

Statement 73. An embodiment of the disclosure includes the article according to statement 72, wherein receiving the second command from the processor at the SSD via the second interface further includes remapping an HDM in the SSD to the buffer.

Statement 74. An embodiment of the disclosure includes the article according to statement 65, wherein the second command includes a write command.

Statement 75. An embodiment of the disclosure includes the article according to statement 65, wherein the second command includes a read command.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:
a processor;
a memory coupled to the processor;
a storage device coupled to the processor, the storage device including a first interface and a second interface, the storage device configured to extend the memory; and
a mode switch to select a selected interface of the first interface and the second interface for a command issued by the processor,
wherein the memory includes at least one physical address accessible via both the first interface and the second interface.

2. The system according to claim 1, wherein the storage device includes:
storage for data;
a controller to manage the data in the storage;
wherein the controller is configured to process the command.

3. The system according to claim 2, wherein the storage device further includes:
a host-managed device memory (HDM); and
a buffer mapped from the HDM,
wherein the processor may access the HDM; and
the buffer may store a copy of a portion of the storage.

4. The system according to claim 1, wherein the storage device includes a Solid State Drive (SSD).

5. The system according to claim 4, wherein the mode switch is configured to select the one of the first interface and the second interface for the command issued by the processor based at least in part on one of a parameter of an operating system, a second data in a file, a metadata of the file, or a type of the command, a data size associated with the command.

6. The system according to claim 4, further comprising a transmitter to transmit the command to the SSD using the selected interface.

7. The system according to claim 6, further comprising a modifier to modify the command based at least in part on the selected interface.

8. The system according to claim 7, wherein the modifier is configured to replace the command with a second command based at least in part on the selected interface, the second command different from the command.

9. The system according to claim 7, wherein the modifier is configured to replace a first parameter of the command with a second parameter of the command based at least in part on the selected interface, the second parameter different from the first parameter.

10. The system according to claim 4, wherein the first interface includes a cache-coherent interconnect protocol.

11. The system according to claim 1, wherein the command includes a command to access a data from the storage device.

12. The system according to claim 1, wherein the mode switch is separate from the storage device.

13. A storage device, comprising:
storage for data;
a controller to manage the data in the storage;
a first interface to receive a first command from a processor; and
a second interface to receive a second command from the processor,
wherein the controller is configured to process the first command and the second command, and
wherein the storage device extends a memory, and
wherein the storage includes at least one physical address accessible via both the first interface and the second interface.

14. The storage device according to claim 13, further comprising:
a host-managed device memory (HDM); and
a buffer mapped from the HDM,
wherein the processor may access the HDM; and
the buffer may store a copy of a portion of the storage.

15. The storage device according to claim 14, further comprising a non-transitory storage medium including instructions to flush the buffer and reload the buffer based at least in part on the storage device receiving the second command.

16. A method, comprising:
receiving a command from a processor at an operating system;
determining that the command accesses data on a storage device, the storage device including a first interface and a second interface; and
selecting a selected interface of the first interface or the second interface based at least in part on the command,
wherein the storage device is configured to extend a memory, and
wherein the storage device includes at least one physical address accessible via both the first interface and the second interface.

17. The method according to claim 16, wherein determining that the command accesses data on the storage device includes determining that the command accesses data on a Solid State Drive (SSD).

18. The method according to claim 17, wherein determining that the command accesses data on the SSD includes determining that the command accesses a host-managed device memory (HDM) of the SSD.

19. The method according to claim 17, wherein selecting the selected interface of the first interface and the second interface based at least in part on the command includes selecting the selected interface of the first interface or the second interface based at least in part on one of a parameter of the operating system, a second data in a file, a metadata of the file, or a type of the command, a data size associated with the command.

20. The method according to claim 17, further comprising transmitting the command to the SSD using the selected interface.

21. The method according to claim 20, wherein transmitting the command to the SSD using the selected interface includes modifying the command based at least in part on the selected interface.

22. The method according to claim 21, wherein modifying the command based at least in part on the selected interface includes replacing the command with a second command based at least in part on the selected interface, the second command different from the command.

* * * * *